June 27, 1967   R. C. BECKWITH ET AL   3,327,335
DOCKBOARD
Filed June 30, 1965   3 Sheets-Sheet 1

INVENTORS
Robert C. Beckwith &
BY Robert W. Hecker, Jr.
Barnard, McGlynn & Reising
ATTORNEYS INVENTORS
Robert C. Beckwith, &
BY Robert W. Hecker, Jr.

Barnard, McGlynn & Reising
ATTORNEYS

United States Patent Office 3,327,335
Patented June 27, 1967

3,327,335
DOCKBOARD
Robert C. Beckwith, Milwaukee, Wis., and Robert W. Hecker, Jr., Clare, Mich., assignors to Loomis Machine Company, Clare, Mich., a corporation of Michigan
Filed June 30, 1965, Ser. No. 468,203
22 Claims. (Cl. 14—71)

This invention relates to a dockboard for a loading dock and, more particularly, to a dockboard including a ramp adapted to be pivotally connected at one end thereof to a support structure, a ramp lip pivotally connected to the second end of the ramp, and an actuation means including a rotatable cam for applying a variable moment to pivot the ramp in a first direction to a first extreme position when the ramp is disposed on a first side of an intermediate position and to allow unaided pivotal movement of the ramp in a second direction when the ramp is disposed on the second side of the intermediate position and to vary the moment to pivot the ramp on the second side of the intermediate position through a predetermined sequence of pivotal movements and for pivoting the ramp lip relative to the ramp in response to pivotal movements of the ramp.

Dockboards of the type to which the instant invention pertains are normally utilized in conjunction with a loading dock to facilitate the free movement of traffic between the loading dock and the bed of a truck, or the like. Loading docks normally have fixed heights; however, trucks, railroad cars, and the like, utilize beds which are at different heights. Furthermore, the bed height of a truck, or the like, is lower when the truck is fully loaded than when the truck is empty so that upon removal of articles from the truck the bed will rise. Trucks, railroad cars, and the like, are often loaded or unloaded by persons passing back and forth between the bed of the vehicle and the loading dock. More frequently, such vehicles are loaded or unloaded by the use of fork lifts, or the like, which are driven between the loading dock and the bed of the vehicle. Due to the various heights of the bed of the vehicles to be loaded or unloaded and the fixed height of the loading dock, dockboards are frequently utilized to interconnect the bed of the vehicle and the loading dock.

Dockboards normally include a ramp pivotally connected to a support structure independent of or forming an integral part of the loading dock such that the ramp may be pivoted so that its outer end contacts the bed of the vehicle to be loaded or unloaded. For example, a truck may be backed to a position adjacent a loading lock and a dockboard pivoted so that the outward end of the ramp of the dockboard contacts the bed of the truck so that people and fork lifts, or the like, may pass between the loading dock and the bed of the truck to either load or unload the truck.

Such dockboards which have heretofore been utilized employ various actuating mechanisms to aid in or to actually pivot the ramp of the dockboard. One such actuation mechanism is the very costly and complex motor drive assembly which is manually controlled by switches, levers, or the like, to pivot the ramp. Such motors are frequently electric motors controlled by push buttons to drive gears, chains, or the like, to pivot the ramp of the dockboard. Still other dockboards utilize numerous different mechanical linkage systems for the actuation mechanism of the ramp. Such mechanical linkage systems, however, do not in and of themselves move the ramp, but rather aid in the manual movement of the ramp, and, therefore, are incapable of pivoting the ramp through a predetermined sequence of movements in different directions. In essence, the actuating mechanisms heretofore utilized with the ramp of a dockboard apply a predetermined moment to the ramp to urge the ramp to pivot in one direction or the other at every particular pivotal position of the ramp, thus, such ramps always have a substantially constant moment applied thereto when the ramp is disposed at any particular pivotal position so that when the ramp is disposed at the same particular pivotal position it is always urged to move in the same direction.

Accordingly, it is an object and general feature of this invention to provide an actuating means for applying a moment to urge the ramp of a dockboard to pivot in a particular direction, but is in addition capable of changing the magnitude of the moment as the ramp remains in a particular pivotal position.

Another object and general feature of this invention is to provide a mechanical actuation means for a ramp of a dockboard which means is capable of automatically moving the ramp in a predetermined sequence of movements in both pivotal directions.

A further object and general feature of this invention is to provide an actuation means for a ramp of a dockboard having a ramp lip pivoted to the outer end thereof such that upon the movement of a vehicle being loaded or unloaded from a loading dock the ramp automatically pivots through a predetermined sequence of movements to a dock level position.

Yet another object and general feature of the present invention is to provide a ramp with a ramp lip pivotally connected to the outer end of the ramp and a mechanical actuation means for applying a variable moment to pivot the ramp in a first direction to a first extreme position when the ramp is disposed on a first side of an intermediate position whereat the variable moment equals the counter moment caused by gravity and to allow unaided pivotal movement of the ramp in a second direction when the ramp is disposed on the second side of the intermediate position and to vary the moment to pivot the ramp on the second side of the intermediate position through a predetermined sequence of pivotal movements and for pivoting the ramp lip relative to the ramp in response to pivotal movements of the ramp.

In general, these and other objects and features of the present invention may be attained by a dockboard including a ramp adapted for pivotal connection at a first end thereof to a support structure with a ramp lip pivotally connected to the other end of the ramp. A lift arm is pivotally connected at one end thereof to the support structure and one or more springs are connected at one end to the lift arm and connected at the other end to either the support structure or the ramp at a point adjacent the pivotal connection between the ramp and the support structure to urge the lift arm to pivot in an upwardly direction. A cam is rotatably connected to the ramp and a cam follower is disposed at the other end of the lift arm for engaging the cam. A cam rotating means is connected at one end thereof to the cam and is connected at the other end thereof either to the lift arm or to the support structure so that the cam rotates upon pivotal movement of the ramp. A ramp lift operating means is connected to the ramp lip to pivot the ramp lip relative to the ramp during predetermined sequential movements of the ramp and includes an adjustable link connected at one end thereof to the ramp lip and connected at the other end thereof to a pivot arm which is in turn pivotally connected to the ramp. A locking arm is pivotally connected to the pivotal connection between the adjustable link and the pivot arm and is disposed for sliding movement along a pin which is secured to the ramp. The locking arm has a cutaway portion such that as the ramp lip is pivoted to an extended cantilevered position, the cutaway portion engages the pin to lock the ramp lip in the extended cantilevered position. The cam has a portion which engages the pivotal connection between the adjustable link, the pivot arm, and the locking arm so that upon rotation of the cam the adjustable link is moved to pivot the ramp lip to the extended cantilevered position. An adjustable stop extends from the lift arm and engages the locking arm to unlock the ramp lip from the extended cantilevered position when the ramp is pivoted to the lower extreme position so that the ramp lip is free to pivot toward the lowered position as the pivotal connection between the adjustable link, the pivot arm, and the locking arm contacts a force plate extending from the lift arm such that forces due to the weight of the ramp lip are transmitted to the lift arm to apply a moment to the lift arm to raise the ramp. The springs attached to the lift arm and the cam are adjusted and calibrated such that the moment applied to the ramp equals the counter moment caused by the gravity of the assembly at an intermediate pivotal position such that when the ramp is positioned above the intermediate position the ramp will pivot to the upper extreme position and when the ramp is positioned below the intermediate position the ramp will pivot to the lower extreme position. When the ramp lip is unlocked to apply an additional moment to the lift arm the ramp is below the intermediate position, but the additional moment is sufficient to move the ramp upwardly toward the intermediate position and the upward extreme position until the ramp lip reaches the lowered position where the additional moment is terminated whereupon the ramp will pivot in the opposite direction downward so that the ramp lip engages a support means on the loading dock or structural frame to retain the ramp in a dock level position. In addition to the above elements, a manual control means may be provided to engage and move the locking arm to unlock the ramp lip from the extended cantilevered position when the ramp is in any particular pivotal position.

Other objects and attendant advantages of the present invention will be readily appreciated as the same becomes better understood by reference to the following detailed description when considered in connection with the accompanying drawings wherein.

Figure 1:
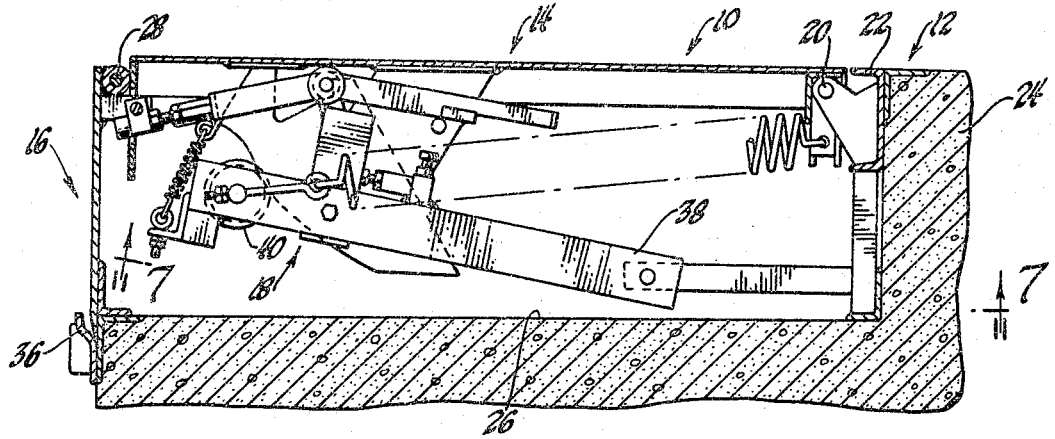
FIGURE 1 is a side view of a preferred embodiment of the present invention partially in cross section showing the ramp at the dock level position.

Referring now to the drawings, wherein like reference numerals indicate like or corresponding parts throughout the several views, there is shown generally at 10 a preferred embodiment of the dockboard of the instant invention. The dockboard 10 is adapted to be attached to a support structure, generally shown at 12, and includes a ramp, generally shown at 14, a ramp lip, generally shown at 16, and an actuation means, generally shown at 18.

The ramp 14 is adapted to be pivotally connected to the support structure 12 through the pin 20. The pin 20 may be secured to any appropriate support structure; however, as illustrated in the drawings, the pin 20 is attached to a frame 22, the frame 22 being secured to a loading dock 24. That is to say, the ramp 14 may be pivotally connected directly to an appropriate support structure or to an intermediate frame such as frame 22. As illustrated, the frame 22 is secured within a recess 26 in the loading dock 24, but the entire dockboard may be adjacent the outer edge of a loading dock.

Figure 3:
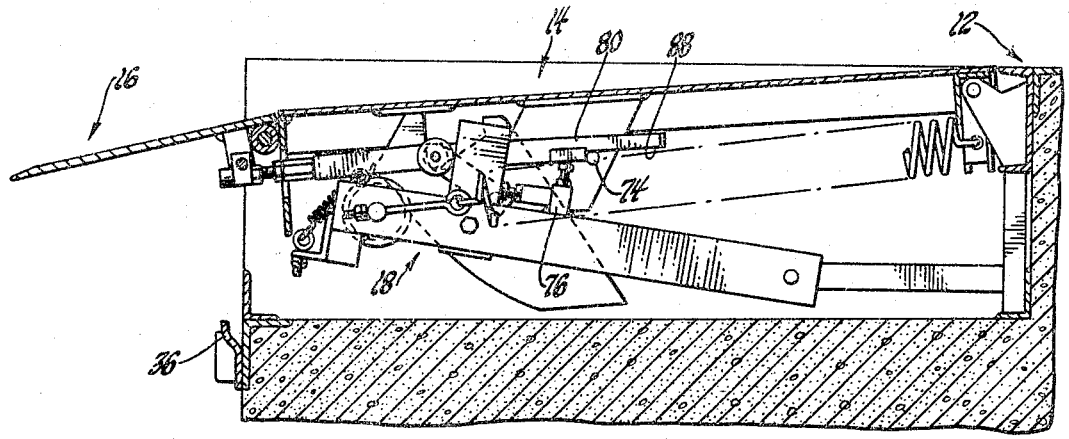
FIGURE 3 is a side view partially in cross section of the embodiment of the invention shown in FIGURE 1 with the ramp pivoted to the lower extreme position.

The ramp 14 is pivotally connected at a first end thereof by the pin 20 to the frame 22 for pivotal movement in either direction between a first extreme position where the ramp 14 is fully raised, a dock level position, as illustrated in FIGURE 1, and a second extreme position, as illustrated in FIGURE 3. In the dock level position, as illustrated in FIGURE 1, traffic may pass uninterrupted along the loading dock 24 and over the ramp 14.

The ramp lip 16 is pivotally connected by the hinge 28 to the second end of the ramp 14 so that the ramp lip 16 may pivot relative to the ramp 14. The ramp lip 16, when in the extended cantilevered position illustrate in FIGURES 2 and 3, may be disposed on the tail gate or the bed of a truck, or the like, to afford free movement of traffic from the truck to the loading dock 24.

Figure 2:
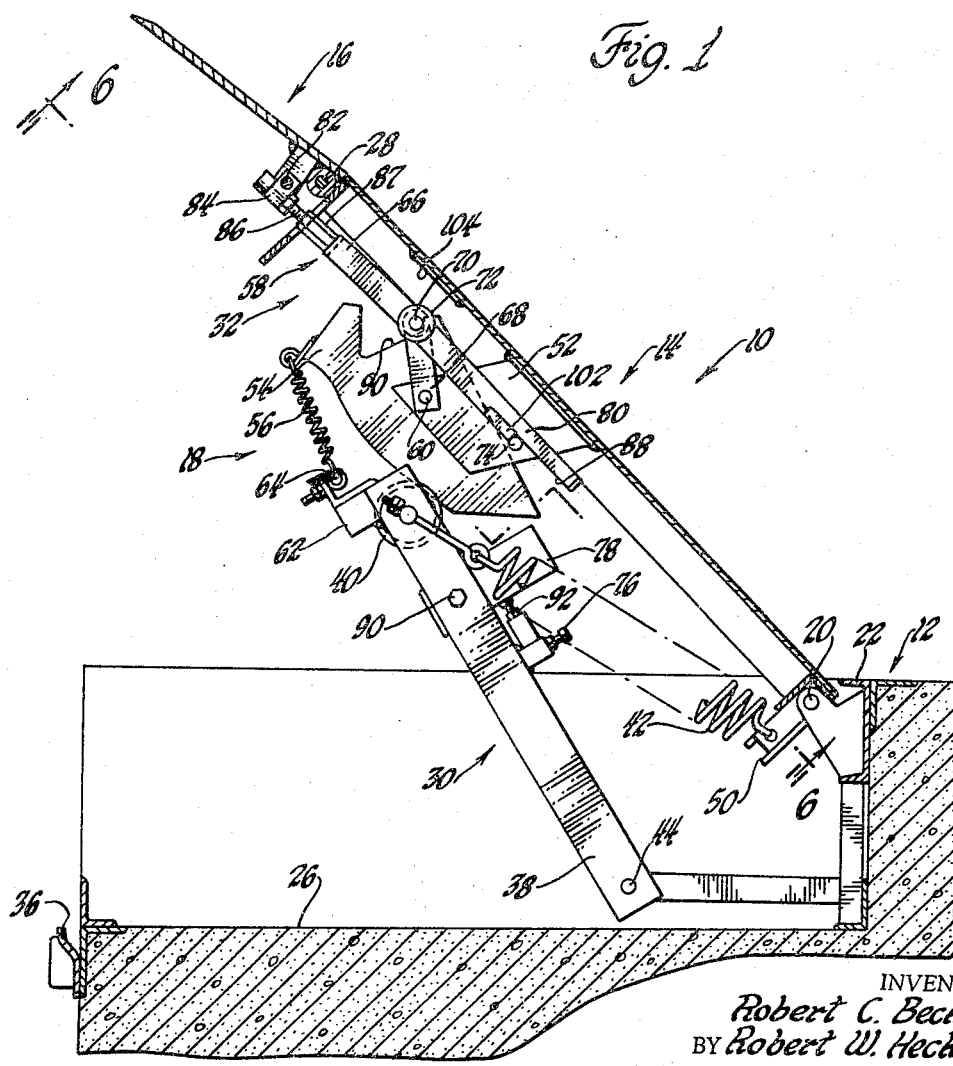
FIGURE 2 is a side view partially in cross section of the embodiment of the invention illustrated in FIGURE 1 with the ramp in a raised position.

The actuation means 18 operatively interconnects the frame 22 of the support structure 12, the ramp 14 and the ramp lip 16 for applying a variable moment to pivot the ramp 14 in a first direction to the upwardly extreme position when the ramp is disposed on the upper side of a predetermined intermediate position, such as that illustrated in FIGURE 2. When the ramp 14 is disposed at such an intermediate position, the moment applied by the actuation means 18 equals the moment caused by gravity due to the weight of the entire assembly so that the ramp 14 will remain in the intermediate position when undisturbed by outside forces. The actuation means 18, therefore, allows unaided pivotal movement of the ramp 14 in a second downwardly direction when the ramp 14 is disposed on the downward side of the intermediate position due to the fact that the moment caused by the weight of the assembly is greater than the moment applied by the actuation means 18. The actuation means 18 also varies the moment applied to the ramp 14 when the ramp 14 is disposed below the intermediate position to pivot the ramp 14 through a predetermined sequence of pivotal movements and to pivot the ramp lip 16 relative to the ramp 14 in response to pivotal movement of the ramp 14.

Figure 6:
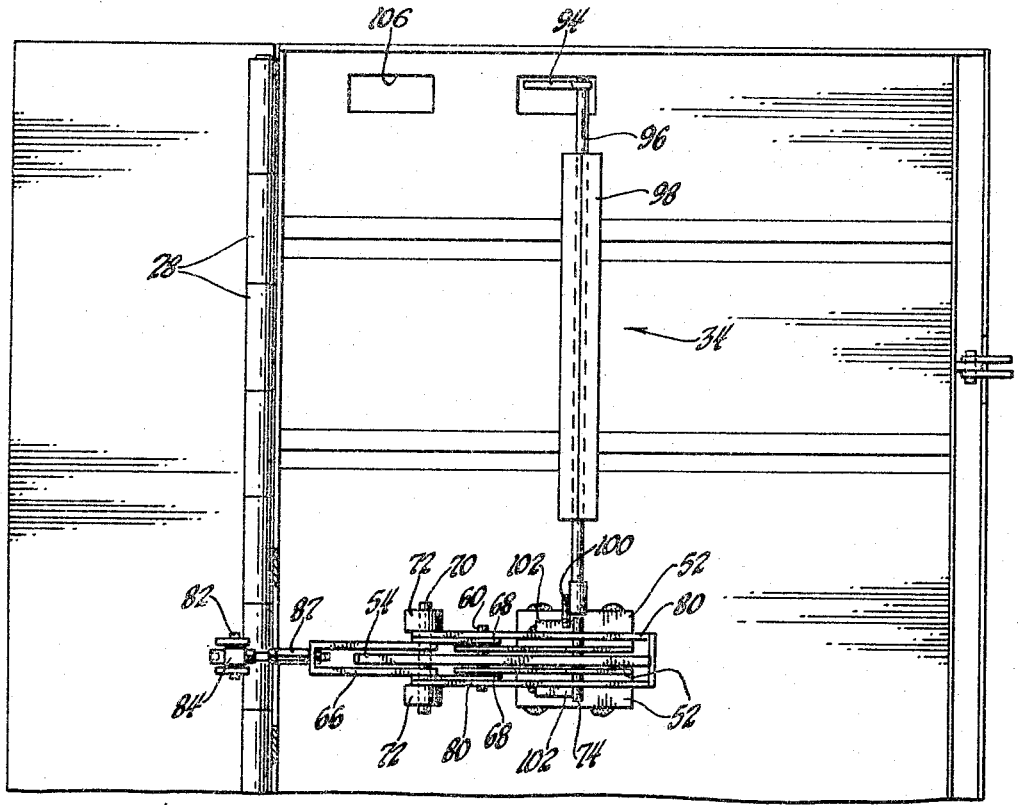
FIGURE 6 is a view partially broken away and taken substantially along line 6—6 of FIGURE 2.

The actuation means 18 includes a lift means, generally shown at 30, a motion means, generally shown at 32, manual control means, generally shown at 34 in FIGURE 6, and support means 36.

Figure 7:
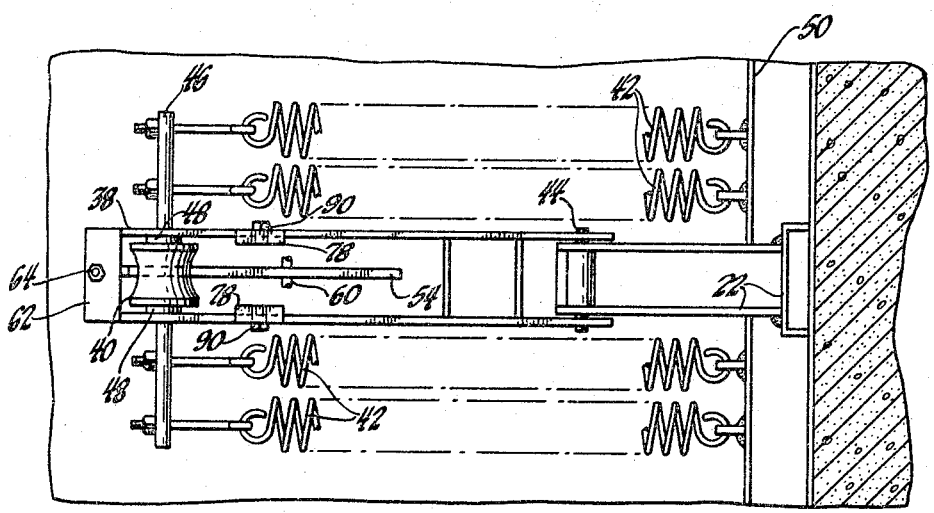
FIGURE 7 is a view partially broken away and taken substantially along line 7—7 of FIGURE 1.

The lift means 30 applies the variable moment to urge the ramp 14 in an upward direction and includes the lift arm 38, the cam follower 40, and biasing means comprising the springs 42. The lift arm 38 is pivotally connected at one end thereof by the pin 44 to the frame 22 of the support structure 12 and a cam follower 40 is disposed on the other end thereof. As is more clearly shown in FIGURE 7, the lift arm 38 is a U-shaped member with a rod 46 extending therethrough. The cam follower 40 is rotatably disposed about the rod 46 and is spaced between the legs of the lift arm 38 by the bushings 48. The springs 42 are attached at one end thereof to the lift arm 38 by way of the rod 46 and are attached at the other end to the flange 50 of the ramp 14 adjacent the pivotal connection by the pin 20 between the ramp 14 and the support structure 12. As an alternative, the springs 42 may also be attached to the support structure 22 adjacent the pivotal connection 20 between the ramp 14 and the support structure 12. The springs 42 urge the lift arm 38 to pivot in an upward direction, and, as is clear from FIGURES 1 and 2, the moment acting upon the lift arm 38 due to the springs 42 varies depending upon the angular disposition of the lift arm 38 due to the fact that as the lift arm 38 pivots in a downward direction the force vector acting on the lift arm 38 from the springs 42 approaches passing through the pin 44, and if the force vector passes through the pin 44, there will be no moment acting on the lift arm 38.

The motion means 32 is attached to the ramp 14 and engages the lift means 30 to respond to the movement of the lift means 30 for pivoting the ramp 14 and for pivoting the ramp lip 16 relative to the ramp 14. The motion means includes the mount 52, the cam 54, the cam rotating means comprising the spring 56, and the ramp lip operating means, generally shown at 58.

The mount 52 is part of the ramp 14 and comprises a pair of parallel spaced plates suspended from the bottom side of the ramp 14 such as by welding as illustrated or in any other appropriate manner.

The cam 54 is rotatably connected to the mount 52 by the shaft 60 which is in turn secured to the plates of the mount 52. The cam 54 engages the cam follower 40 and is capable of rotating about the shaft 60 to change the magnitude and direction of the moment acting upon the ramp 14. That is to say, when the cam follower 40 contacts the cam 54 in any particular position as a result of the relationship between the lift means 30 and the ramp 14, a force acting in a particular direction will be transmitted from the cam follower 40 to the cam 54, but when the ramp 14 is maintained in a particular position relative to the lift means 30, the cam 54 may be rotated about the shaft 60 such that the force acting on the cam 54 from the cam follower 40 will act on the cam 54 in a different direction to change the magnitude of the force vector creating the moment tending to rotate the ramp 14, thus changing the moment. Therefore, as in any other cam arrangement, the cam 54 may have various configurations not only to control the magnitude of the force vector creating the moment tending to pivot the ramp 14 as a result of the force transmitted from the cam follower 40 to the cam 54 as relative movement occurs between the ramp 14 and the lift means 30, but in addition the cam 54 may be rotated to change the magnitude of the force vector creating the moment tending to rotate the ramp 14 when the ramp 14 is in a fixed position relative to the lift means 30. The plate 104 is secured to the underside of the ramp 14 to act as a stop member for the cam 54.

The spring 56 is connected at one end to the end of the lift arm 38 by way of the flange 62 and the eyelet 64 and is connected at the other end to the cam 54. The spring 56 rotates the cam 54 upon pivotal movement of the ramp 14, which movement changes the relative disposition between the ramp 14 and the lift arm 38.

The ramp lip operating means 58 is operatively connected to the ramp lip 16 for pivoting from a lowered position to and locking the ramp lip in the extended cantilevered position illustrated in FIGURES 2 and 3 as the ramp 14 is pivoted from the dock level position, as illustrated in FIGURE 1, toward the intermediate position and the upper extreme position so that the center of gravity of the ramp 14 and the ramp lip 16 as combined moves relative to the ramp 14 from a first to a second imaginary point. In addition, the ramp lip operating means 58 automatically unlocks the ramp lip 16 from the extended cantilevered position to allow the ramp lip 16 to pivot toward the lowered position illustrated in FIGURE 5 when the ramp 14 reaches the lower extreme position illustrated in FIGURE 3 such that the center of gravity moves from the second imaginary point back toward the first imaginary point, and at the same time applies an additional moment to the lift arm 38 as the ramp lip 16 pivots toward the lowered position to pivot the ramp 14 in an upward direction toward the intermediate position so that when the ramp lip 16 reaches the lowered position the additional moment is terminated and the ramp 14 pivots in the downward direction to the dock level position illustrated in FIGURE 1. The ramp lip operating means 58 includes the adjustable link 66, the pivot arm 68, the shaft 70, the rollers 72, the pin 74, the adjustable stop 76, the adjustable force plates 78, and the locking arm 80.

The adjustable link 66 is operatively connected at the first end thereof to the ramp lip 16 by way of the pin 82 and strap 84. The adjustable link 66 includes a threaded portion 86 cooperable with the nut 87 to adjust the length of the adjustable link 66. The pivot arm 68 is pivotally connected at one end thereof to the mount 52 by way of the shaft 60. Another shaft 70 is disposed at the other end of the pivot arm 68 and the adjustable link 66 is pivotally connected at the other end thereof to the shaft 70. The rollers 72 are also disposed on the shaft 70. As is more clearly shown in FIGURE 6, the adjustable link 66 is a U-shaped member having portions disposed on either side of the cam 54 and connected to the shaft 60. Also, as more clearly shown in FIGURE 6, the pivot arm 68 comprises a pair of links disposed on either side of the adjustable link 66. The locking arm 80 is also a U-shaped member, as is more clearly shown in FIGURE 6, having legs disposed on either side of the links of the pivot arm 68.

Th pin 74 projects from the mount 52, and the locking arm 80, pivotally connected at a first end thereof to the shaft 70, is disposed for sliding movement along the pin 74. The locking arm 80 has a cutaway portion 88 to receive the pin 74 for preventing sliding movement of the locking arm 80 in one direction along the pin 74 to maintain the ramp lip 16 in the extended cantilevered position illustrated in FIGURES 2 and 3.

The cam 54 has a portion 90 for engaging the shaft 70 to pivot the ramp lip 16 relative to the ramp 14 from the lowered position illustrated in FIGURE 1 to the extended cantilevered position illustrated in FIGURE 2 as the ramp 14 pivots upwardly from the dock level position shown in FIGURE 1.

The adjustable stop 76 extends from the lift arm 38 for engaging the locking arm 80, as illustrated in FIGURE 3, for moving the cutaway portion 88 away from the pin 74 when the ramp 14 is pivoted in the downward direction to the lower extreme position to allow the ramp lip 16 to pivot toward the lowered position. The adjustable stop 76 comprises a bolt threadedly engaging a nut which is in fixed relation to the lift arm 38 such that the distance the bolt extends from the lift arm 38 may be selectively changed.

Figure 4:
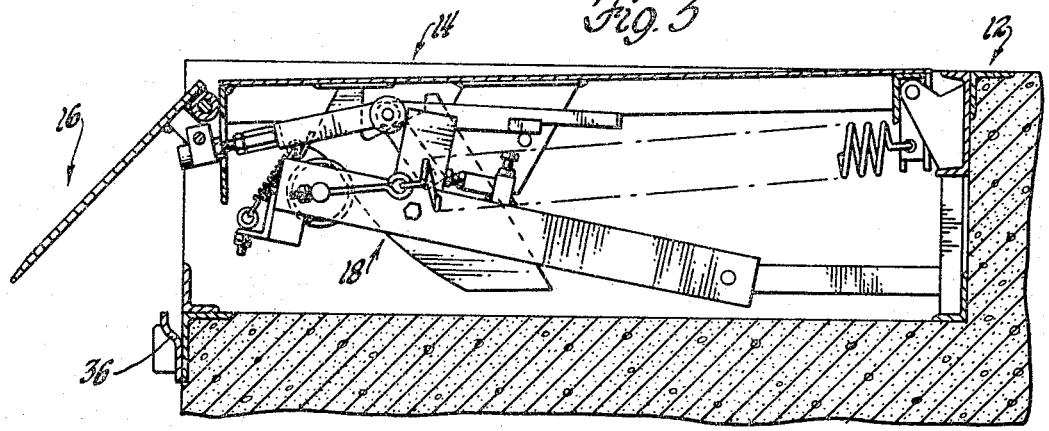
FIGURE 4 is a side view partially in cross section of the embodiment of the invention illustrated in FIGURE 1 with the ramp in a position above the lower extreme position and the ramp lip pivoting toward its lowered position.

The adjustable force plates 78 also extend from the lift arm 38 and receive forces transmitted thereto by the rollers 72 due to the weight of the ramp lip 16 as the ramp lip 16 pivots toward the lowered position to provide an additional moment tending to rotate the lift arm 38, which is illustrated in FIGURE 4. The adjustable force plates 78 are attached by bolts 90 to the respective legs of the lift arm 38. The plates 78 have slots therein so that they may be moved relative to the lift arm 38 by adjusting the adjustment means 92 and loosening the bolts 90. The disposition of the plates 78 relative to the lift arm 38 will affect the magnitude of the moment tending to rotate the lift arm 38 due to the force resulting from the weight of the ramp lip 16 as transmitted to the plates 78 by the rollers 72.

There is also included a manual control means 34 which is operatively connected to the ramp 14 for moving the locking arm 80 to move the cutaway portion 88 away from the pin 74 to allow the locking arm 80 to slide along the pin 74 to allow the ramp lip 16 to pivot. As is more clearly shown in FIGURE 6, the manual control means 34 comprises a lever 94 attached to a shaft 96. The shaft 96 is operatively connected to the ramp 14 by a V-shaped angle member 98. The shaft 96 rests on the inside of the apex of the V-shaped member 98 with the V-shaped member 98 being secured to the underside of the ramp 14 by welding, brazing, or the like. The shaft 96 extends to a position adjacent one leg of the locking arm 80 and has attached thereto, by welding, or the like, the pin 100. Each leg of the locking arm 80 has a block 102 attached thereto by welding, brazing, or the like. Upon movement of the lever 94, the shaft 96 is rotated such that the pin 100 engages the lower edge of one of the blocks 102 to move the locking arm 80 to move the cutaway portion 88 away from the pin 74. The lever 94 may be manually actuated when the ramp 14 is in any position to unlock the ramp lip 16 to allow the ramp lip 16 to rotate toward the lowered position illustrated in FIGURE 5.

The support means 36 comprises an angled member secured to the loading dock 24 or structural frame for receiving the ramp lip 16, as illustrated in FIGURE 1, when the ramp lip 16 is in the lowered position to maintain the ramp 14 in the dock level position illustrated in FIGURE 1.

*Operation*

When the dockboard 10 is not in use for loading or unloading a vehicle, it is in the position as illustrated in FIGURE 1 where the ramp 14 is disposed at the dock level position to allow free movement of traffic across the ramp 14 at a level even with the loading dock 24. While in the stowed position illustrated in FIGURE 1, the ramp lip 16 engages the support means 36 to maintain the ramp 14 at the dock level position. A truck, or the like, may be backed to a position adjacent the loading dock, and the ramp 14 may be manually gripped by the grip hole 106 and moved in a first direction upwardly toward the position shown in FIGURE 2. The ramp 14 is easily moved upwardly from the dock level position since the actuation means 18 creates a moment almost of sufficient magnitude to pivot the ramp 14 in an upward direction from the dock level position, but the moment is not quite sufficient to overcome the counter moment created by the gravitational forces acting on the system. There is, however, an intermediate position of the ramp 14 at which the moment applied by the actuation means 18 tending to rotate the ramp 14 upwardly equals the counter moment caused by gravity tending to rotate the ramp 14 downwardly so that the ramp 14 will maintain itself in the intermediate position when not acted upon by outside forces. Therefore, when the ramp 14 is positioned above the intermediate position, the moment acting on the ramp 14 by the actuation means 18 is greater than the counter moment caused by the gravitational forces acting upon the assembly so that the ramp 14 pivots toward the upwardly extreme position. Likewise, the ramp 14 will pivot toward the lower extreme position when positioned below the intermediate position since the counter moment caused by gravitational forces is greater than the moment applied by the lift means 30 except during a predetermined sequence of pivotal movements of the ramp 14 as the ramp lip 16 is pivoting to the lowered position, which operation is more fully set forth hereinafter.

When the ramp 14 is pivoted upwardly from the dock level position illustrated in FIGURE 1, the cam 54 rotates about the shaft 60 due to the action of the spring 56 so that the portion 90 of the cam 54 contacts the shaft 70 to move the adjustable link 66 to pivot the ramp lip 16 toward the extended cantilevered position illustrated in FIGURES 2 and 3. When the ramp lip 16 reaches the cantilevered position, the recessed portion 88 of the locking arm 80 will engage the pin 74 to lock the ramp lip 16 in the extended cantilevered position, which locking occurs before the ramp 14 reaches the intermediate position. Once the ramp lip 16 is locked in the extended cantilevered position, the center of gravity of the ramp assembly has shifted away from the pivoted end of the ramp 14 from a first to a second imaginary point causing an increase of the moment caused by the gravitational forces acting upon the assembly. The ramp 14 is then lowered such that the ramp lip 16 may contact the tail gate or bed of a vehicle, such as a truck, or the like, to allow free movement of traffic between the loading dock 24 and the vehicle.

Figure 5:
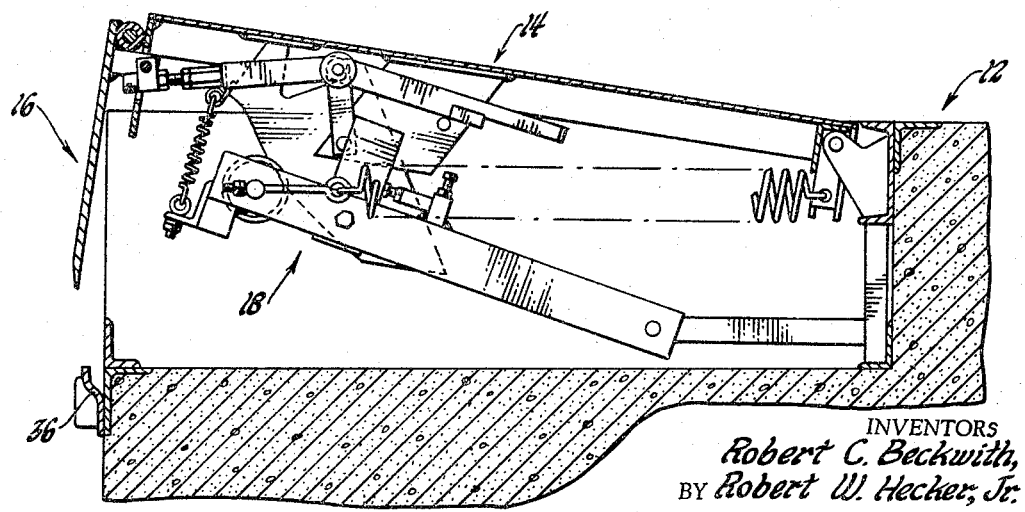
FIGURE 5 is a side view partially in cross section of the embodiment of the invention illustrated in FIGURE 1 with the ramp positioned above the dock level position and the ramp lip in the lowered position.

As alluded to previously, when the ramp 14 is below the intermediate position whereat the variable moment created by the action of the lift means 30 equals the counter moment caused by the gravitational forces acting on the assembly, the ramp 14 will normally pivot downwardly. Thus, if the ramp lip 16 is resting upon the tail gate or bed of a truck and the truck pulls away, the weight of the assembly will cause the ramp 14 to pivot downwardly. The ramp 14 will pivot in a downward direction to the extreme position shown in FIGURE 3 where the adjustable stop 76 engages the block 102 of the locking arm 80 to move the cutaway portion 88 away from the pin 74 to unlock the ramp lip 16 from the extended cantilevered position. When the locking arm 80 is moved upwardly by the adjustment stop 76, the ramp lip 16 is free to pivot toward the lowered position shown in FIGURE 5. The weight of the ramp lip 16 provides a moment tending to pivot the ramp lip 16 toward the lowered position and the forces of that moment are transmitted through the adjustment link 66 and the rollers 72 to the force plates 78 as the ramp lip pivots downward as illustrated in FIGURE 3. Upon being unlocked, therefore, the weight of the ramp lip 16 as it pivots to the lowered position transmits a force to the plates 78 and thus the lift arm 38 of the lift means 30 to provide an additional moment tending to rotate the lift arm 30 in the upward direction to raise the ramp 14. The actuation means 18 is adjusted and calibrated such that the additional moment applied to the lift arm 38 of the lift means 30 is sufficient in combination with the moment applied by the lift means 30 to pivot the ramp 14 upwardly. The ramp 14 pivots upwardly due to the additional moment applied by the ramp lip 16 when the ramp lip pivots to the lowered position and the rollers 72 engage the side or face of the force plates 78. As illustrated in FIGURE 4, the ramp 14 is pivoting upwardly toward the intermediate and the upward extreme positions due to the moment applied by the lift means 30 in combination with the moment applied by the ramp lip 16, and once the ramp lip 16 pivots downward to a predetermined position relative to the ramp 14, the rollers 72 leave or disengage the force plates 78 and the ramp lip 16 reaches the lowered position as shown in FIGURE 5. When the rollers 72 disengage the force plates 78, the ramp 14 is below the intermediate position such that the moment caused by the weight of the assembly is greater than the moment applied by the lift means 30 so that once the ramp lip 16 is in the lowered position the ramp 14 then reverses direction of pivotal movement to pivot downwardly. As the ramp 14 pivots downwardly, the ramp lip 16 engages the support means 36 so that the ramp 14 is maintained at the dock level position illustrated in FIGURE 1.

In addition to the automatic unlocking feature of the ramp lip operation means 58, the locking arm 80 may be moved upwardly to move the recess portion 88 from the pin 74 by the manual control means 34 when the ramp lip 16 is in the extended cantilevered position and the ramp 14 is in any particular pivotal position. The manual control means may be operated by manually moving the lever 94 which to rotate the shaft 96 which in turn engages the pin 100 with one of the blocks 102 to move the locking arm 80 to unlock the ramp lip 16 from the extended cantilevered position.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard for a loading dock comprising: a support structure; a ramp structure pivotally connected to said support structure; a cam rotatably attached to one of said structures; and lift means engaging said cam and operatively connected to the other of said structures for applying a force to said cam to apply a variable moment to said ramp structure as said ramp structure pivots.

2. A dockboard for a loading dock comprising: a support structure; a ramp pivotally connected at a first end thereof to said support structure for pivotal movement from a first extreme position to an intermediate position to a second extreme position and vice versa; actuating means operatively interconnecting said support structure and said ramp for applying a moment to pivot said ramp in a first direction to said first extreme position when said ramp is disposed on a first side of said intermediate position and for allowing pivotal movement of said ramp in a second direction when said ramp is disposed on a second side of said intermediate position, said actuation means including; lift means for applying said moment to urge said ramp in said first direction, and a cam rotatably connected to said ramp for engaging said lift means and for selectively rotating to change the magnitude and direction of said moment acting upon said ramp.

3. A dockboard for a loading dock comprising: a support structure; a ramp pivotally connected at a first end thereof to said support structure for pivotal movement from a first extreme position to an intermediate position to a second extreme position and vice versa; actuation means operatively interconnecting said support structure and said ramp for applying a variable moment to pivot said ramp in a first direction to said first extreme position when said ramp is disposed on a first side of said intermediate position whereat said variable moment equals the counter moment caused by gravity and to allow unaided pivotal movement of said ramp in a second direction when said ramp is disposed on a second side of said intermediate position, said actuation means including; lift means for applying said variable moment to urge said ramp in said first direction, a cam rotatably connected to said ramp and engaging said lift means, and cam rotating means connected to said cam and the lift means for rotating said cam upon pivotal movement of said ramp.

4. A dockboard as set forth in claim 3 wherein said lift means includes a lift arm pivotally connected at a first end thereof to said support structure, a cam follower disposed on the second end of said lift arm and engaging said cam, biasing means attached at one end thereof to said lift arm and operatively attached at the other end thereof to said support structure for urging said lift arm to pivot in said first direction.

5. A dockboard as set forth in claim 4 wherein said biasing means includes at least one spring, and including a mount suspended from said ramp, said cam being rotatably connected to said mount, said cam rotating means comprising at least one spring.

6. A dockboard for a loading dock comprising: a support structure; a ramp pivotally connected at a first end thereof to said support structure for pivotal movement from a first extreme position to an intermediate position to a dock level position to a second extreme position and vice versa; a ramp lip pivotally connected to the second end of said ramp; actuation means operatively interconnecting said support structure, said ramp and said ramp lip for applying a variable moment to pivot said ramp in a first direction to said first extreme position when said ramp is disposed on a first side of said intermediate position whereat said variable moment equals the counter moment caused by gravity and to allow unaided pivotal movement of said ramp in a second direction when said ramp is disposed on a second side of said intermediate position and to vary said moment to pivot said ramp on said second side of said intermediate position through a predetermined sequence of pivotal movements and for pivoting said ramp lip relative to said ramp in response to pivotal movements of said ramp, said actuation means including; lift means for applying said variable moment to urge said ramp in said first direction and including, a lift arm pivotally connected at a first end thereof to said support structure, biasing means comprising at least one spring attached at one end thereof to said lift arm and attached at the other end thereof to one of said support structure and said ramp adjacent the pivotal connection between said ramp and said support structure for urging said lift arm to pivot in said first direction, motion means attached to said ramp and engaging said lift arm to respond to movement of said lift arm for pivoting from a lowered position to and locking said ramp lip in an extended cantilevered position as said ramp is pivoted from said dock level position toward said intermediate position so that the center of gravity of said ramp and ramp lip moves relative to said ramp from a first to a second imaginary point and for automatically unlocking said ramp lip from said extended cantilevered position to allow said ramp lip to pivot toward said lowered position when said ramp reaches said second extreme position to allow said center of gravity to move from said second imaginary point toward said first imaginary point and for applying an additional moment to said lift arm as said ramp lip pivots toward said lowered position to pivot said ramp in said first direction toward said intermediate position so that when said ramp lip reaches said lowered position said additional moment is terminated and said ramp pivots in said second direction to said dock level position and including, an adjustable link operatively connected at a first end thereof to said ramp lip, a pivot arm pivotally connected at a first end thereof to said mount, a shaft connected to the second end of said pivot arm, said adjustable link pivotally connected at the second end thereof to said shaft, a roller disposed on said shaft, a pin projecting from said mount, a locking arm pivotally connected at a first end thereof to said shaft and disposed for sliding movement along said pin, said locking arm having a cut-away portion to receive said pin for preventing sliding movement of said locking arm in one direction along said pin to maintain said ramp lip in said extended cantilevered position, means for engaging said shaft to pivot said ramp lip relative to said ramp from said lowered position to said extended cantilevered position as said ramp pivots in said first direction from said dock level position, an adjustable stop extending from said lift arm for engaging said locking arm to move said cutaway portion away from said pin when said ramp is pivoted in said second direction to said second extreme position to allow said ramp lip to pivot toward said lowered position, and an adjustable force plate extending from said lift arm for receiving forces transmitted thereto by said roller due to the weight of said ramp lip as said ramp lip pivots toward said lowered position to provide such additional moment.

7. A dockboard for a loading dock comprising: a support structure; a ramp pivotally connected at a first end thereof to said support structure for pivotal movement from a first extreme position to an intermediate position to a dock level position to a second extreme position and vice versa; a ramp lip pivotally connected to the second end of said ramp; actuation means operatively interconnecting said support structure, said ramp and said ramp lip for applying a variable moment to pivot said ramp in a first direction to said first extreme position when said ramp is disposed on a first side of said intermediate position whereat said variable moment equals the counter moment caused by gravity and to allow unaided pivotal movement of said ramp in a second direction when said ramp is disposed on a second side of said intermediate position and to vary said moment to pivot said ramp on said second side of said intermediate position through a predetermined sequence of pivotal movements and for pivoting said ramp lip relative to said ramp in response to pivotal movements of said ramp, said actuation means including; lift means for applying said variable moment to urge said ramp in said first direction, motion means attached to said ramp and engaging said lift means to respond to movement of said lift means for pivoting said ramp and for pivoting said ramp lip relative to said ramp and including, a cam rotatably connected to said ramp for engaging said lift means, cam rotating means connected to said cam for rotating said cam upon pivotal movement of said ramp, and ramp lip operating means operatively connected to said ramp lip for pivoting from a lowered position to and locking said ramp lip in an extended cantilevered position as said ramp is pivoted from said dock level position toward said intermediate position so that the center of gravity of said ramp and ramp lip moves relative to said ramp from a first to a second imaginary point and for automatically unlocking said ramp lip from said extended cantilevered position to allow said ramp lip to pivot toward said lowered position when said ramp reaches said second extreme position to allow said center of gravity to move from said second imaginary point toward said first imaginary point and for applying an additional moment to said lift means as said ramp lip pivots toward said lowered position to pivot said ramp in said first direction toward said intermediate position so that when said ramp lip reaches said lowered position said additional moment is terminated and said ramp pivots in said second direction to said dock level position.

8. A dockboard for a loading dock comprising: a support structure; a ramp pivotally connected at a first end thereof to said support structure for pivotal movement from a first extreme position to an intermediate position to a dock level position to a second extreme position and vice versa; a ramp lip pivotally connected to the second end of said ramp; actuation means operatively interconnecting said support structure, said ramp and said ramp lip for applying a variable moment to pivot said ramp in a first direction to said first extreme position when said ramp is disposed on a first side of said intermediate position whereat said vairable moment equals the counter moment caused by gravity and to allow unaided pivotal movement of said ramp in a second direction when said ramp is disposed on a second side of said intermediate position and to vary said moment to pivot said ramp on said second side of said intermediate position through a predetermined sequence of pivotal movements and for pivoting said ramp lip relative to said ramp in response to pivotal movements of said ramp, said actuation means including; lift means for applying said variable moment to urge said ramp in said first direction, motion means attached to said ramp and engaging said lift means to respond to movement of said lift means for pivoting said ramp and for pivoting said ramp lip relative to said ramp and including, a mount suspended from said ramp, a cam rotatably connected to said mount for engaging said lift means, cam rotating means connected to said cam for rotating said cam upon pivotal movement of said ramp, and ramp lip operating means operatively connected to said ramp lip for pivoting from a lowered position to and locking said ramp lip in an extended cantilevered position as said ramp is pivoted from said dock level position toward said intermediate position and for automatically unlocking said ramp lip from said extended cantilevered position to allow said ramp lip to pivot toward said lowered position when said ramp reaches said second extreme position and for applying an additional moment to said lift means as said ramp lip pivots toward said lowered position to pivot said ramp in said first direction toward said intermediate position so that when said ramp lip reaches said lowered position said additional moment is terminated and said ramp pivots in said second direction to said dock level position and including, a link operatively connected at a first end thereof to said ramp lip, a pivot arm pivotally connected at a first end thereof to said mount, a shaft connected to the second end of said pivot arm, said link pivotally connected at the second end thereof to said shaft, a pin projecting from said mount, a locking arm pivotally connected at a first end thereof to said shaft and disposed for sliding movement along said pin, said locking arm having a cutaway portion to receive said pin for preventing sliding movement of said locking arm in one direction along said pin to maintain said ramp lip in said extended cantilevered position, said cam having a portion for engaging said shaft to pivot said ramp lip relative to said ramp from said lowered position to said extended cantilevered position as said ramp pivots in said direction from said dock level position, an adjustable stop extending from said lift means for engaging said locking arm to move said cutaway portion away from said pin when said ramp is pivoted in said second direction to said second extreme position to allow said ramp lip to pivot toward said lowered position, and an adjustable force plate extending from said lift means for receiving forces transmitted thereto by said link due to the weight of said ramp lip as said ramp lip pivots toward said lowered position to provide said additional moment.

9. A dockboard for a loading dock comprising: a support structure; a ramp pivotally connected at a first end thereof to said support structure for pivotal movement from a first extreme position to an intermediate position to a dock level position to a second extreme position and vice versa; a ramp lip pivotally connected to the second end of said ramp; actuation means operatively interconnecting said support structure, said ramp and said ramp lip for applying a variable moment to pivot said ramp in a first direction to said first extreme position when said ramp is disposed on a first side of said intermediate position whereat said variable moment equals the counter moment caused by gravity and to allow unaided pivotal movement of said ramp in a second direction when said ramp is disposed on a second side of said intermediate position and to vary said moment to pivot said ramp on said second side of said intermediate position through a predetermined sequence of pivotal movements and for pivoting said ramp lip relative to said ramp in response to pivotal movements of said ramp, said actuation means including; lift means for applying said variable moment to urge said ramp in said first direction, motion means attached to said ramp and engaging said lift means to respond to movement of said lift means for pivoting said ramp and for pivoting said ramp lip relative to said ramp and including, a mount suspended from said ramp, a cam rotatably connected to said mount for engaging said lift means, cam rotating means connected to said cam for rotating said cam upon pivotal movement of said ramp, and ramp lip operating means operatively connected to said ramp lip for pivoting from a lowered position to and locking said ramp lip in an extended cantilevered position as said ramp is pivoted from said dock level position toward said intermediate position so that the center of gravity of said ramp and ramp lip moves relative to said ramp from a first to a second imaginary point and for automatically unlocking said ramp lip from said extended cantilevered position to allow said ramp lip to pivot toward said lowered position when said ramp reaches said second extreme position to allow said center of gravity to move from said second imaginary point toward said first imaginary point and for applying an additional moment to said lift means as said ramp lip pivots toward said lowered position to pivot said ramp in said first direction toward said intermediate position so that when said ramp lip reaches said lowered position said additional moment is terminated and said ramp pivots in said second direction to said dock level position and including, an adjustable link operatively connected at a first end thereof to said ramp lip, a pivot arm pivotally connected at a first end thereof to said mount, a shaft connected to the second end of said pivot arm, said adjustable link pivotally connected at the second end thereof to said shaft, a roller disposed on said shaft, a pin projecting from said mount, a locking arm pivotally connected at a first end thereof to said shaft and disposed for sliding movement along said pin, said locking arm having a cutaway portion to receive said pin for preventing sliding movement of said locking arm in one direction along said pin to maintain said ramp lip in said extended cantilevered position, said cam having a portion for engaging said shaft to pivot said ramp lip relative to said ramp from said lowered position to said extended cantilevered position as said ramp pivots in said first direction from said dock level position, an adjustable stop extending from said lift means for engaging said locking arm to move said cutaway portion away from said pin when said ramp is pivoted in said second direction to said second extreme position to allow said ramp lip to pivot toward said lowered position, and an adjustable force plate extending from said lift means for receiving forces transmitted thereto by said roller due to the weight of said ramp lip as said ramp lip pivots toward said lowered position to provide said additional moment.

10. A dockboard for a loading dock comprising: a support structure; a ramp pivotally connected at a first end thereof to said support structure for pivotal movement from a first extreme position to an intermediate position to a dock level position to a second extreme position and vice versa; a ramp lip pivotally connected to the second end of said ramp; actuation means operatively interconnecting said support structure, said ramp and said ramp lip for applying a variable moment to pivot said ramp in a first direction to said first extreme position when said ramp is disposed on a first side of said intermediate position whereat said variable moment equals the counter moment caused by gravity and to allow unaided pivotal movement of said ramp in a second direction when said ramp is disposed on a second side of said intermediate position and to vary said moment to pivot said ramp on said second side of said intermediate position through a predetermined sequence of pivotal movements and for pivoting said ramp lip relative to said ramp in response to pivotal movements of said ramp, said actuation means including; lift means for applying said variable moment to urge said ramp in said first direction and including, a lift arm pivotally connected at a first end thereof to said support structure, a cam follower disposed on the second end of said lift arm, and biasing means attached at one end thereof to said lift arm and attached at the other end thereof to one of said support structure and said ramp adjacent the pivotal connection between said ramp and said support structure for urging said lift arm to pivot in said first direction, motion means attached to said ramp and engaging said cam follower to respond to movement of said lift arm for pivoting said ramp and for pivoting said ramp lip relative to said ramp and including, a mount suspended from said ramp, a cam rotatably connected to said mount for engaging said cam follower, cam rotating means connected to said cam for rotating said cam upon pivotal movement of said ramp, and ramp lip operating means operatively connected to said ramp lip for pivoting from a lowered position to and locking said ramp lip in an extended cantilevered position as said ramp is pivoted from said dock level position toward said intermediate position so that the center of gravity of said ramp and ramp lip moves relative to said ramp from a first to a second imaginary point and for automatically unlocking said ramp lip from said extended cantilevered position to allow said ramp lip to pivot toward said lowered position when said ramp lip reaches said second extreme position to allow said center of gravity to move from said second imaginary point toward said first imaginary point and for applying an additional moment to said lift arm as said ramp lip pivots toward said lowered position to pivot said ramp in said first direction toward said intermediate position so that when said ramp lip reaches said lowered position said additional moment is terminated and said ramp pivots in said second direction to said dock level position and including, an adjustable link operatively connected at a first end thereof to said ramp lip, a pivot arm pivotally connected at a first end thereof to said mount, a shaft connected to the second end of said pivot arm, said adjustable link pivotally connected at the second end thereof to said shaft, a roller disposed on said shaft, a pin projecting from said mount, a locking arm pivotally connected at a first end thereof to said shaft and disposed for sliding movement along said pin, said locking arm having a cutaway portion to receive said pin for preventing sliding movement of said locking arm in one direction along said pin to maintain said ramp lip in said extended cantilevered position, said cam having a portion for engaging said shaft to pivot said ramp lip relative to said ramp from said lowered position to said extended cantilevered position as said ramp pivots in said first direction from said dock level position, an adjustable stop extending from said lift arm for engaging said locking arm to move said cutaway portion away from said pin when said ramp is pivoted in said second direction to said second extreme position to allow said ramp lip to pivot toward said lowered position, and an adjustable force plate extending from said lift arm for receiving forces transmitted thereto by said roller due to the weight of said ramp lip as said ramp lip pivots toward said lowered position to provide said additional moment.

11. A dockband for a loading dock comprising: a support structure; a ramp pivotally connected at a first end thereof to said support structure for pivotal movement from a first extreme position to an intermediate position to a dock level position to a second extreme position and vice versa; a ramp lip pivotally connected to the second end of said ramp; actuation means operatively interconnecting said support structure, said ramp and said ramp lip for applying a variable moment to pivot said ramp in a first direction to said first extreme position when said ramp is disposed on a first side of said intermediate position whereat said variable moment equals the counter moment caused by gravity and to allow unaided pivotal movement of said ramp in a second direction when said ramp is disposed on a second side of said intermediate position and to vary said moment to pivot said ramp on said second side of said intermediate position through a predetermined sequence of pivotal movements and for pivoting said ramp lip relative to said ramp in response to pivotal movements of said ramp, said actuation means including; lift means for applying said variable moment to urge said ramp in said first direction and including, a lift arm pivotally connected at a first end thereof to said support structure, a cam follower disposed on the second end of said lift arm, and biasing means attached at one end thereof to said lift arm and attached at the other end thereof to one of said support structure and said ramp adjacent the pivotal connection between said ramp and said support structure for urging said lift arm to pivot in said first direction, motion means attached to said ramp and engaging said cam follower to respond to movement of said lift arm for pivoting said ramp and for pivoting said ramp lip relative to said ramp and including, a mount suspended from said ramp, a cam rotatably connected to said mount for engaging said cam follower, cam rotating means connected to said cam for rotating said cam upon pivotal movement of said ramp, and ramp lip operating means operatively connected to said ramp lip for pivoting from a lowered position to and locking said ramp lip in an extended cantilevered position as said ramp is pivoted from said dock level position toward said intermediate position so that the center of gravity of said ramp and ramp lip moves relative to said ramp from a first to a second imaginary point and for automatically unlocking said ramp lip from said extended cantilevered position to allow said ramp lip to pivot toward said lowered position when said ramp reaches said second extreme position to allow said center of gravity to move from said second imaginary point toward said first imaginary point and for applying an additional moment to said lift arm as said ramp lip pivots toward said lowered position to pivot said ramp in said first direction toward said intermediate position so that when said ramp lip reaches said lowered position said additional moment is terminated and said ramp pivots in said second direction to said dock level position and including, an adjustable link operatively connected at a first end thereof to said ramp lip, a pivot arm pivotally connected at a first end thereof to said mount, a shaft connected to the second end of said pivot arm, said adjustable link pivotally connected at the second end thereof to said shaft, a roller disposed on said shaft, a pin projecting from said mount, a locking arm pivotally connected at a first end thereof to said shaft and disposed for sliding movement along said pin, said locking arm having a cutaway portion to receive said pin for preventing sliding movement of said locking arm in one direction along said pin to maintain said ramp lip in said extended cantilevered position, said cam having a portion for engaging said shaft to pivot said ramp lip relative to said ramp from said lowered position to said extended cantilevered position as said ramp pivots in said first direction from said dock level position, an adjustable stop extending from said lift arm for engaging said locking arm to move said cutaway portion away from said pin when said ramp is pivoted in said second direction to said second extreme position to allow said ramp lip to pivot toward said lowered position, and an adjustable force plate extending from said lift arm for receiving forces transmitted thereto by said roller due to the weight of said ramp lip as said ramp lip pivots toward said lowered position to provide said additional moment, and manual control means operatively connected to said ramp for moving said locking arm to move said cutaway portion away from said pin to allow said locking arm to slide along said pin to allow said ramp lip to pivot.

12. A dockboard for a loading dock comprising: a support structure; a ramp pivotally connected at a first end thereof to said support structure for pivotal movement from a first extreme position to an intermediate position to a dock level position to a second extreme position and vice versa; a ramp lip pivotally connected to the second end of said ramp; actuation means operatively interconnecting said support structure, said ramp and said ramp lip for applying a variable moment to pivot said ramp in a first direction to said first extreme position when said ramp is disposed on a first side of said intermediate position whereat said variable moment equals the counter moment caused by gravity and to allow unaided pivotal movement of said ramp in a second direction when said ramp is disposed on a second side of said intermediate position and to vary said moment to pivot said ramp on said second side of said intermediate position through a predetermined sequence of pivotal movements and for pivoting said ramp lip relative to said ramp in response to pivotal movements of said ramp, said actuation means including; lift means for applying said variable moment to urge said ramp in said first direction and including, a lift arm pivotally connected at a first end thereof to said support structure, a cam follower disposed on the second end of said lift arm, and biasing means attached at one end thereof to said lift arm and attached at the other end thereof to one of said support structure and said ramp adjacent the pivotal connection between said ramp and said support structure for urging said lift arm to pivot in said first direction, motion means attached to said ramp and engaging said cam follower to respond to movement of said lift arm for pivoting said ramp and for pivoting said ramp lip relative to said ramp and including, a mount suspended from said ramp, a cam rotatably connected to said mount for engaging said cam follower, cam rotating means connected to said cam for rotating said cam upon pivotal movement of said ramp, and ramp lip operating means operatively connected to said ramp lip for pivoting from a lowered position to and locking said ramp lip in an extended cantilevered position as said ramp is pivoted from said dock level position toward said intermediate position so that the center of gravity of said ramp and ramp lip moves relative to said ramp from a first to a second imaginary point and for automatically unlocking said ramp lip from said extended cantilevered position to allow said ramp lip to pivot toward said lowered position when said ramp reaches said second extreme position to allow said center of gravity to move from said second imaginary point toward said first imaginary point and for applying an additional moment to said lift arm as said ramp lip pivots toward said lowered position to pivot said ramp in said first direction toward said intermediate position so that when said ramp lip reaches said lowered position said additional moment is terminated and said ramp pivots in said second direction to said dock level position and including, an adjustable link operatively connected at a first end thereof to said ramp lip, a pivot arm pivotally connected at a first end thereof to said mount, a shaft connected to the second end of said pivot arm, said adjustable link pivotally connected at the second end thereof to said shaft, a roller disposed on said shaft, a pin projecting from said mount, a locking arm pivotally connected at a first end thereof to said shaft and disposed for sliding movement along said pin, said locking arm having a cutaway portion to receive said pin for preventing sliding movement of said locking arm in one direction along said pin to maintain said ramp lip in said extended cantilevered position, said cam having a portion for engaging said shaft to pivot said ramp lip relative to said ramp from said lowered position to said extended cantilevered position as said ramp pivots in said first direction from said dock level position, an adjustable stop extending from said lift arm for engaging said locking arm to move said cutaway portion away from said pin when said ramp is pivoted in said second direction to said second extreme position to allow said ramp lip to pivot toward said lowered position, and an adjustable force plate extending from said lift arm for receiving forces transmitted thereto by said roller due to the weight of said ramp lip as said ramp lip pivots towards said lowered position to provide said additional moment, and support means for receiving said ramp lip when said ramp lip is in the lowered position to maintain said ramp in said dock level position.

13. A dockboard for a loading dock comprising: a support structure; a ramp pivotally connected at a first end thereof to said support structure; a ramp lip pivotally connected to the second end of said ramp; a lift arm pivotally connected at a first end thereof to said support structure; a cam follower disposed on the second end of said lift arm; biasing means attached to said lift arm for urging said lift arm to pivot in a first direction; a cam rotatably connected to said ramp for engaging said cam follower; cam rotating means connected to said cam for rotating said cam upon pivotal movement of said ramp; and ramp lip operating means operatively connected to said ramp lip for pivoting from a lowered position to and locking said ramp lip in an extended cantilevered position as said ramp is pivoted from a dock level position toward an intermediate and a first extreme position so that the center of gravity of said ramp and ramp lip moves relative to said ramp from a first to a second imaginary point and for automatically unlocking said ramp lip from said extended cantilevered position to allow said ramp lip to pivot toward said lowered position when said ramp reaches a second extreme position to allow said center of gravity to move from said second imaginary point toward said first imaginary point and for applying an additional moment to said lift arm as said ramp lip pivots toward said lowered position to pivot said ramp in said first direction toward said intermediate position so that when said ramp lip reaches said lowered position said additional moment is terminated and said ramp pivots in said second direction to said dock level position.

14. A dockboard for a loading dock comprising: a support structure, a ramp pivotally connected at a first end thereof to said support structure, a ramp lip pivotally connected to the second end of said ramp, a lift arm pivotally connected at a first end thereof to said support structure; a cam follower disposed on the second end of said lift arm, at least one spring attached at one end thereof to said lift arm and attached at the other end thereof to one of said support structure and said ramp adjacent the pivotal connection between said ramp and said support structure, a mount suspended from said ramp, a cam rotatably connected to said mount for engaging said cam follower, at least one spring connected at one end thereof to the second end of said lift arm and connected at the other end thereof to said cam, an adjustable link operatively connected at a first end thereof to said ramp lip, a pivot arm pivotally connected at a first end thereof to said mount, a shaft connected to the second end of said pivot arm, said adjustable link pivotally connected at the second end thereof to said shaft, a roller disposed on said shaft, a pin projecting from said mount, a locking arm pivotally connected at a first end thereof to said shaft and disposed for sliding movement along said pin, said locking arm having a cutaway portion to receive said pin, said cam having a portion for engaging said shaft, an adjustable stop extending from said lift arm for engaging said locking arm, an adjustable force plate extending from said lift arm for receiving forces transmitted thereto by said roller, manual control means operatively connected to said ramp for moving said locking arm to move said cutaway portion away from said pin and support means for receiving said ramp lip.

15. A dockboard for a loading dock comprising: a support structure; a ramp pivotally connected at a first end thereof to said support structure for pivotal movement from a first extreme position to an intermediate position to a dock level position to a second extreme position and vice versa; a ramp lip pivotally connected to the second end of said ramp; actuation means operatively interconnecting said support structure, said ramp and said ramp lip for applying a variable moment to pivot said ramp in a first direction to said first extreme position when said ramp is disposed on a first side of said intermediate position whereat said variable moment equals the counter moment caused by gravity and to allow unaided pivotal movement of said ramp in a second direction when said ramp is disposed on a second side of said intermediate position and to vary said moment to pivot said ramp on said second side of said intermediate position through a predetermined sequence of pivotal movements and for pivoting said ramp lip relative to said ramp in response to pivotal movements of said ramp, said actuation means including; lift means for applying said variable moment to urge said ramp in said first direction and including, a lift arm pivotally connected at a first end thereof to said support structure, a cam follower disposed on the second end of said lift arm, and biasing means comprising at least one spring attached at one end thereof to said lift arm and attached at the other end thereof to one of said support structure and said ramp adjacent the pivotal connection between said ramp and said support structure for urging said lift arm to pivot in said first direction, motion means attached to said ramp and engaging said cam follower to respond to movement of said lift arm for pivoting said ramp and for pivoting said ramp lip relative to said ramp and including, a mount suspended from said ramp, a cam rotatably connected to said mount for engaging said cam follower, cam rotating means comprising at least one spring connected at one end thereof to the second end of said lift arm and connected at the other end thereof to said cam for rotating said cam upon pivotal movement of said ramp, and ramp lip operating means operatively connected to said ramp lip for pivoting from a lowered position to and locking said ramp lip in an extended cantilevered position as said ramp is pivoted from said dock level position toward said intermediate and said first extreme position so that the center of gravity of said ramp and ramp lip moves relative to said ramp from a first to a second imaginary point and for automatically unlocking said ramp lip from said extended cantilevered position to allow said ramp lip to pivot toward said lowered position when said ramp reaches said second extreme position to allow said center of gravity to move from said second imaginary point toward said first imaginary point and for applying an additional moment to said lift arm as said ramp lip pivots toward said lowered position to pivot said ramp in said first direction toward said intermediate position so that when said ramp lip reaches said lowered position said additional moment is terminated and said ramp pivots in said second direction to said dock level position and including, an adjustable link operatively connected at a first end thereof to said ramp lip, a pivot arm pivotally connected at a first end thereof to said mount, a shaft connected to the second end of said pivot arm, said adjustable link pivotally connected at the second end thereof to said shaft, a roller disposed on said shaft, a pin projecting from said mount, a locking arm pivotally connected at a first end thereof to said shaft and disposed for sliding movement along said pin, said locking arm having a cutaway portion to receive said pin for preventing sliding movement of said locking arm in one direction along said pin to maintain said ramp lip in said extended cantilevered position, said cam having a portion for engaging said shaft to pivot said ramp lip relative to said ramp from said lowered position to said extended cantilevered position as said ramp pivots in said first direction from said dock level position, an adjustable stop extending from said lift arm for engaging said locking arm to move said cutaway portion away from said pin when said ramp is pivoted in said second direction to said second extreme position to allow said ramp lip to pivot toward said lowered position, and an adjustable force plate extending from said lift arm for receiving forces transmitted thereto by said roller due to the weight of said ramp lip as said ramp lip pivots toward said lowered position to provide said additional moment, manual control means operatively connected to said ramp for moving said locking arm to move said cutaway portion away from said pin to allow said locking arm to slide along said pin to allow said ramp lip to pivot, and support means for receiving said ramp lip when said ramp lip is in the lowered position to maintain said ramp in said dock level position.

16. A dockboard for a loading dock comprising: a support structure; a ramp pivotally connected at a first end thereof to said support structure; a ramp lip pivotally connected to the second end of said ramp; a cam rotatably connected to said ramp; lift means connected to said support structure and operatively engaging said cam for urging said ramp to pivot whereby said cam is rotated; and ramp lip operating means operatively interconnecting said ramp lip and said cam for pivoting said ramp lip from a lowered position to an extended cantilevered position upon rotation of said cam.

17. A dockboard as set forth in claim 16 wherein said ramp is pivotally connected to said support structure for pivotal movement from an upper extreme position to a dock level position and to a lower extreme position, first means for locking said ramp lip in said extended cantilevered position, second means for automatically unlocking said ramp lip when said ramp is pivoted to said lower extreme position to allow said ramp lip to pivot to said lowered position.

18. A dockboard as set forth in claim 17 including third means for transmitting an additional moment to said ramp from said ramp lip as the latter pivots toward said lowered position whereby said ramp is pivoted upward until said ramp lip is in the lowered position thereby terminating said additional moment so that said ramp pivots to said dock level position.

19. A dockboard as set forth in claim 18 wherein said lift means includes a lift arm pivotally connected to said support structure, biasing means operatively interconnecting said lift arm and said support structure, said lift arm being in engagement with said cam for urging said ramp to pivot toward said upper extreme position.

20. A dockboard as set forth in claim 19 wherein said ramp lip operating means includes a link pivotally connected to said ramp lip and engaging said cam for pivoting said ramp lip upon rotation of said cam, and said first means includes a locking arm operatively connected to said link and including means for locking engagement with a portion of said ramp to lock said ramp lip in said extended cantilevered position.

21. A dockboard as set forth in claim 20 wherein said second means includes a stop extending from said lift arm to move said locking arm out of said locking engagement when said ramp is pivoted to said lower extreme position whereby said ramp lip is free to pivot toward said lowered position.

22. A dockboard as set forth in claim 21 wherein said third means includes a force plate extending from said lift arm for operatively engaging said link for receiving forces due to the weight of said ramp lip as the latter pivots toward said lowered position thereby applying said additional moment to said ramp.

References Cited
UNITED STATES PATENTS

| | | | |
|---|---|---|---|
| 3,117,332 | 1/1964 | Kelley et al. | 14—71 |
| 3,137,867 | 6/1964 | Loomis | 14—71 |
| 3,201,814 | 8/1965 | Le Clear | 14—71 |
| 3,204,270 | 9/1965 | Fenton | 14—71 |
| 3,235,896 | 2/1966 | Riggs | 14—71 |
| 3,249,956 | 5/1966 | Zajac | 14—71 |

JACOB L. NACKENOFF, *Primary Examiner.*